United States Patent [19]
McGourty

[11] 3,707,778
[45] Jan. 2, 1973

[54] TEACHING MACHINE
[75] Inventor: Thomas K. McGourty, Aptos, Calif.
[73] Assignee: EDP Limited, Nassau, Bahamas
[22] Filed: Oct. 20, 1971
[21] Appl. No.: 190,773

[52] U.S. Cl. ..................................................35/9 B
[51] Int. Cl. ..............................................G09b 7/02
[58] Field of Search ...............35/9 R, 9 A, 9 B, 48 R

[56] References Cited

UNITED STATES PATENTS

| | | | |
|---|---|---|---|
| 3,538,623 | 11/1970 | Johnston | 35/9 A |
| 3,600,824 | 8/1971 | Robinson | 35/9 B |

*Primary Examiner*—Wm. H. Grieb
*Attorney*—Eckhoff, Hoppe, Slick, Mitchell & Anderson

[57] ABSTRACT

A teaching machine is provided for use with question and answer sheets wherein the correct answers appear to be randomly spaced on the sheet. A cursor moves over a ruler and a student presses the button when he believes he has the right answer. An indicator such as green or red lights indicate whether a right or wrong answer has been obtained and means are provided on both the cursor and the ruler so that the connections are reversed from column to column and from line to line so that the student does not learn any set pattern as to where the correct response will be on the machine. A relay may be provided so that after the button is depressed the light will remain lit until the cursor or ruler is moved. A novel rack and pinion arrangement maintains the ruler in a parallel relationship with the answer sheet.

7 Claims, 9 Drawing Figures

INVENTOR.
THOMAS K. MCGOURTY

INVENTOR.
THOMAS K. McGOURTY

INVENTOR.
THOMAS K. McGOURTY

TEACHING MACHINE

SUMMARY OF THE INVENTION

Various teaching machines have been proposed in the past but these have suffered from a number of disadvantages. One is that many machines effectively destroy the question and answer sheet so that the sheets must be replaced with each use. In accordance with the present invention, an electrical indicating means is used which is actuated by the position of the parts and which does not mark or injure the sheets in any manner.

Other teaching machines have had rather simple pattern arrangements so that students quickly learn the position of the correct answer on the sheet.

In accordance with the present invention a teaching machine is provided wherein the answer positions are reversed from column to column and from line to line and this, coupled with the fact that the correct answer can be at any one of a number of positions on a given line, prevents the student from learning where the correct answer will be.

Other teaching machines have required the use of special sheets which are marked or destroyed during the learning process but in the device of the present invention, the sheets are not mutilated in any manner and can therefore be reused almost indefinitely.

The device of the present invention preferably incorporates a relay circuit so that after an answer is made, the light will remain lit until the ruler and/or cursor are moved to a new position.

Another feature of the present invention is a novel rack and pinion arrangement which maintains the ruler parallel with the sheet at all times.

Preferably the ruler is made by a printed circuit technique which provides a very effective yet inexpensive structure.

Other features and advantages of the invention will be brought out in the specification which follows.

DESCRIPTION OF THE PREFERRED EMBODIMENTS

Figure 1:
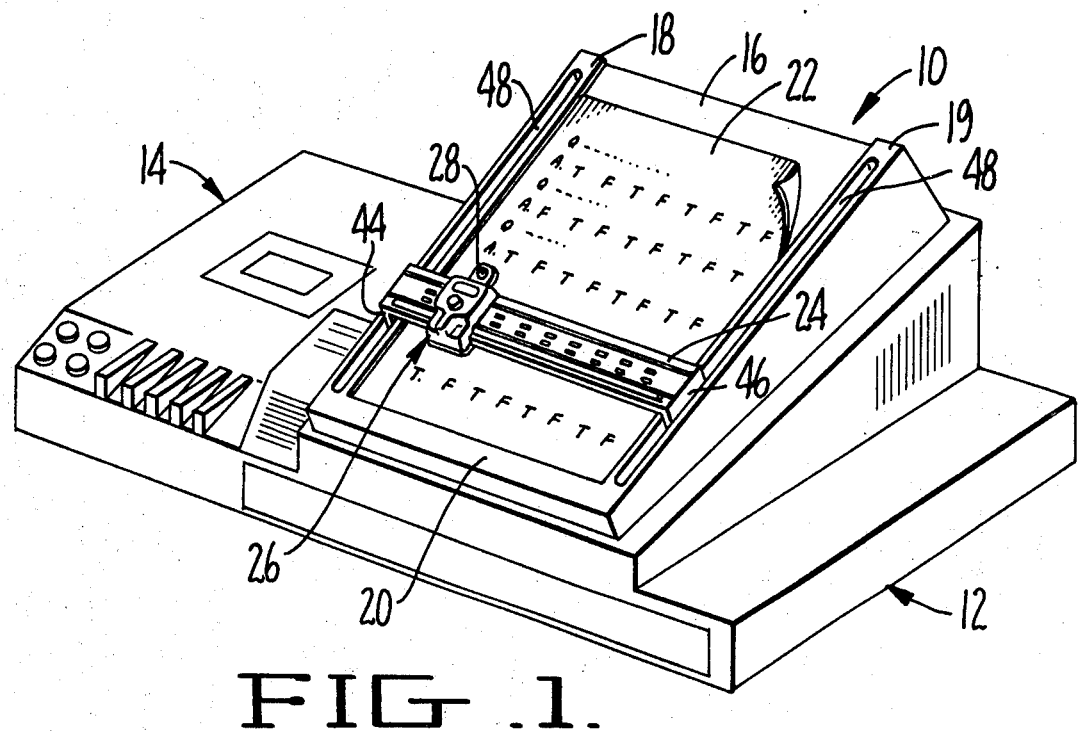
FIG. 1 is a perspective view of a teaching machine embodying the present invention.
Figure 2:
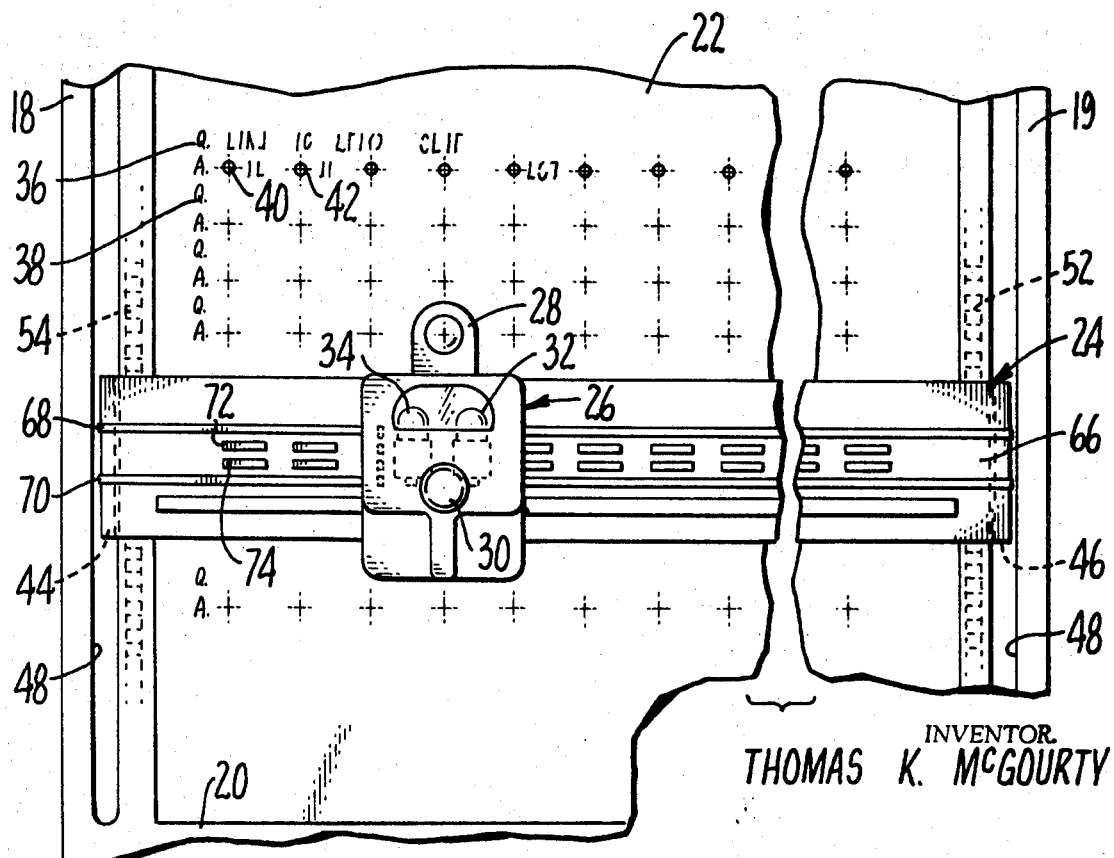
FIG. 2 is an enlarged partial view of the platen of the teaching machine.
Figure 3:
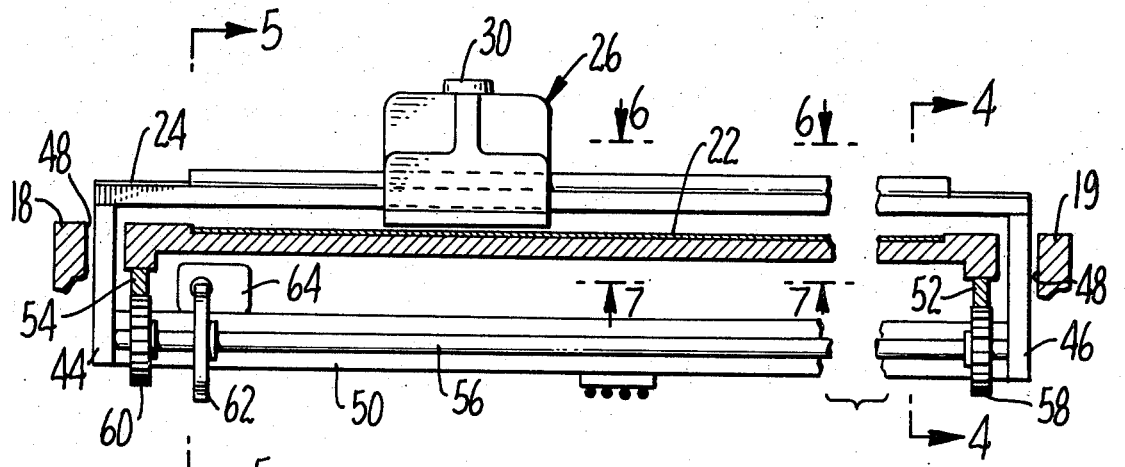
FIG. 3 is an end view of the teaching machine showing some of the parts in section.
Figures 4, 5:
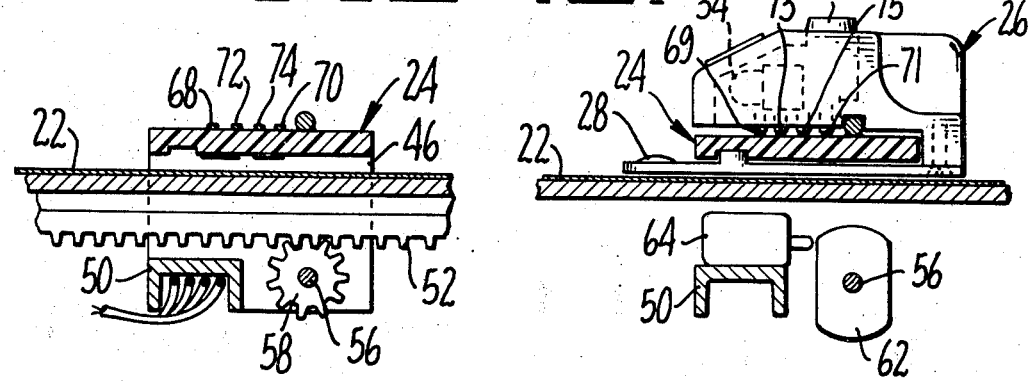
FIG. 4 is a section on the line 4—4 of FIG. 3.
FIG. 5 is a section on the line 5—5 of FIG. 3.
Figure 6:
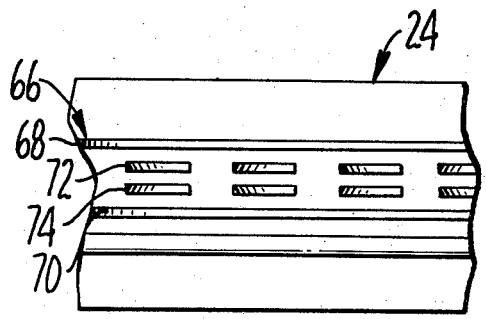
FIG. 6 is an enlarged partial view of the front side of the ruler.

The teaching machine of the present invention is shown in FIG. 1 and is generally designated 10. It is mounted on a base 12 and mounted on this same base may be another teaching aid such as a tape recorder 14.

The teaching machine 10 has a platen 16 which may be set at a convenient angle for work such as about 30°. At either side of platen 16 are guides 18 and 19 and these, together with a bottom guide 20, allow a question and answer sheet 22 to be accurately positioned and held on the platen. A ruler 24 is mounted for sliding movement over the platen and is maintained in a parallel relationship with the lines on the question and answer sheet 22 by means hereinafter described. Mounted on the ruler 24 is a cursor 26 which is mounted for sliding movement from side to side. The cursor includes a position indicator 28, an interrogation switch 30 and two bulbs such as a green bulb 32 to indicate a correct answer and a red bulb 34 to indicate a wrong answer. Ordinarily sheet 22 would have a series of questions on spaced lines as at 36 and 38 and directly under the questions would be a series of answers, each of which has an index mark as at 40 and 42. On the answer sheet a complete grid is shown wherein the correct and incorrect answer points are shown completely across the sheet but it will be understood that in a practical answer sheet one or more of the answers might occupy a width representing several of the answer points and the correct answer might be at any one of the many correct answer points. Although normally the questions and answers would appear on the same sheet, the sheet might contain only answers and the questions might be in a separate book or on tape and keyed to the answer sheet.

In use, the student would place a question and answer sheet 22 into the machine and then run the cursor 26 over the answer line until the indicator 28 rests upon what the student feels is the correct answer. He then pushes the button 30 and, if the answer is correct, the green light 32 comes on, while if it is incorrect, the red light 34 comes on. In a preferred embodiment of the device, after the switch 30 is pressed, the light stays on until the circuit is broken either by moving the cursor or the ruler.

Having described the general operation of the teaching machine, we now turn to a detailed description of the various parts. The ruler 24 has end brackets 44 and 46 which extend downwardly through the slots 48 in the platen. These are connected together at their bottom ends by the cross member 50 so that a rigid structure is provided. Mounted under the platen near the edges thereof are racks 52 and 54. A shaft 56 is mounted for rotation on brackets 44 and 46 and this has pinions 58 and 60 which mesh with the respective racks. Thus, this rack and pinion arrangement provides a stable ruler and one which does not tend to twist or bind as it is moved up and down the platen.

Mounted on shaft 56 is a cam 62 while a single pole double throw microswitch 64 is mounted on the cross member 50. The action of the cam and the microswitch is such that the electrical connections are reversed from line to line as is hereinafter described in more detail.

Figure 7:
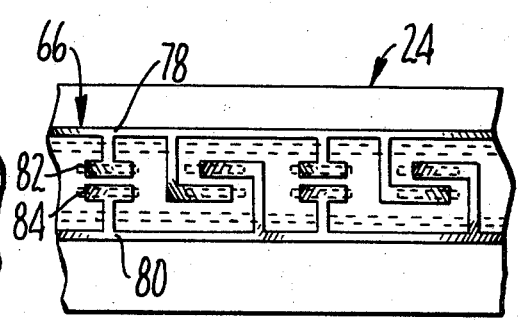
FIG. 7 is a partial rear view of the ruler.

The cursor 26 is mounted for sliding movement from side to side on ruler 24 and ruler 24 is provided with a printed circuit board 66 and this preferably has four rows of contacts, namely, continuous contacts 68 and 70 going from one side of the board to the other and an upper series of intermittent contacts 72 and a lower series 74. The cursor has four wiper contacts in its preferred form, namely, 69, 71, 73, and 75 and these contact rows 68, 70, 72, and 74, respectively. The back of the circuit board is shown in FIG. 7 and this consists of a top bus 78 and a bottom bus 80 which lead to connections 82 and 84 going through the opposite side of the circuit board in the rows 72 and 74. It will be seen that the contacts are reversed for each column from one side of the board to the other.

Figure 8:
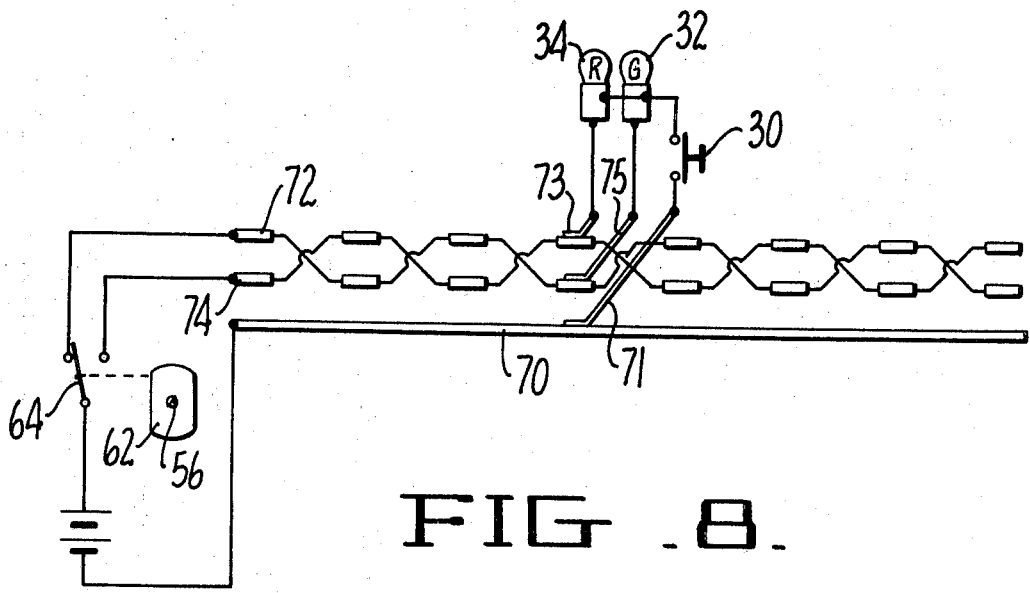
FIG. 8 is a schematic diagram of one form of circuitry which may be employed with the teaching machine.

In FIG. 8 a simplified diagram is shown of one form of electrical circuitry suitable for use with the device of the present invention. Here only one continuous contact 70 is employed and there are three wiper contacts on the cursor. From inspection of the circuit diagram, it will be seen that with the position of switch 64 as shown, line 72 is "hot" so that with the cursor in the position shown, if one pushes the button 30, light 32, the green or correct light, comes on. It is also apparent that if the cam 62 is rotated one-fourth of a revolution, line 74 becomes the hot line through the action of switch 64. In this position, light 34 would light indicating the wrong answer. Also, if the cam were left in the position illustrated, and the cursor moved one position to the right or left, the connections would likewise be reversed, so that by pushing button 30, light 34, the red or wrong light, would be lit. Thus, as the cursor is moved from side to side, the connections are alternately reversed from column to column. It is also apparent as the ruler is moved from top to bottom, the connections will be reversed from line to line. This, coupled with the fact that the correct answer may be indexed at any position from one side of the sheet to the other, produces a pattern not readily discovered by the student.

Figure 9:
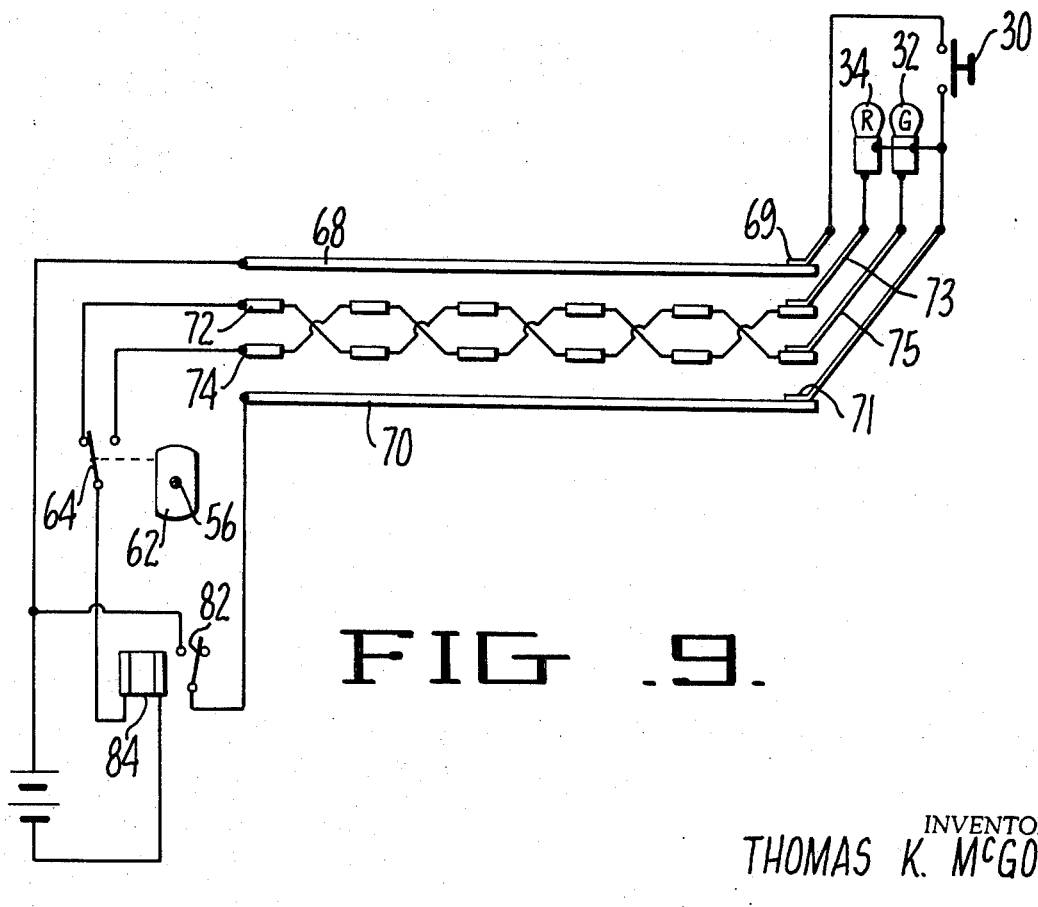
FIG. 9 is a schematic diagram of another form of electrical circuitry wherein the light is maintained in the on position after the pushbutton has been released.

In FIG. 9 an improved form of circuitry is shown where in addition to bus 70 there is also provided a second bus 68 and the cursor has four wipers. A s.p.s.t. relay having contacts 82 and a coil 84 is also employed with the coil 84 in series with the power circuit and with the contacts 82 in parallel with switch 30. The operation is as previously described except that if the button 30 is pushed momentarily, a circuit is established through contacts 82 so that when switch 30 is released, current continues to flow, keeping one or the other of the bulbs lit until the cursor is either moved to a new column or the ruler is moved to a different line. Either will, of course, momentarily break the circuit allowing the relay to drop out.

It is also possible to employ the teaching machine of the present invention with a counter to indicate the number of correct and/or incorrect answers. This has not been illustrated and it is only necessary to connect a counter to the wiring for bulb 32 if one wishes to make a record of correct answers and one may also attach a counter to bulb 34 if one wishes both correct and incorrect answers to be recorded.

Although certain specific forms of circuitry have been shown, it is obvious that many variations can be made in the exact structure shown without departing from the spirit of this invention. For instance, it is not necessary to employ the cam and microswitch arrangement to switch from line to line but instead one can employ a commutator instead of the cam and switch or wiper means with a printed circuit to reverse connections from line to line. Similarly, other means can be used to switch the electrical connections from column to column.

Instead of the lights shown, other visible or audible indicators may be employed, and the indicators could be mounted elsewhere rather than on the cursor.

I claim:
1. A teaching machine having in combination:
   a. a platen adapted to receive and hold an answer sheet in a fixed position,
   b. said platen being divided by a grid of imaginary points arranged in lines and columns,
   c. a ruler adapted to slide up and down over said platen in parallel relationship with said lines,
   d. a cursor slideably mounted on said ruler and adapted to slide back and forth on the ruler over said columns,
   e. an interrogation switch on said cursor adapted to be pushed by a student when said cursor points at what is considered to be a correct answer,
   f. electrical circuit means including indicia means to indicate whether a selected answer is right or wrong,
   g. first circuit reversal means whereby the circuit is reversed as to right and wrong answers as the ruler is moved from one line to the next and,
   h. second circuit reversal means on said ruler whereby the position of right and wrong answers is reversed from column to column.

2. The structure of claim 1 wherein the ruler is maintained in its moveable parallel relationship by means of a pair of racks mounted on the back of the platen and wherein the ruler has attached thereto a shaft with pinions engaging said rack.

3. The structure of claim 2 wherein said shaft actuates said first circuit reversal means as the ruler is moved from line to line.

4. The structure of claim 3 including a ruler support means with a double pole microswitch mounted on said support and a cam mounted on said shaft whereby turning said shaft operates said microswitch to reverse the circuitry from line to line.

5. The structure of claim 1 wherein the interrogation switch actuates the coil of a relay, said relay having contacts in parallel with said interrogation switch whereby momentarily closing said interrogation switch will maintain said indicia means in the on position.

6. The structure of claim 1 wherein the ruler has printed circuit means whereby the cursor circuitry is reversed from column to column.

7. The structure of claim 1 wherein the indicia means is located on the cursor.

* * * * *